United States Patent
Hiyama et al.

(10) Patent No.: US 10,079,535 B2
(45) Date of Patent: Sep. 18, 2018

(54) VOLTAGE CONTROL APPARATUS

(71) Applicant: FUJITSU LIMITED, Kawasaki-shi, Kanagawa (JP)

(72) Inventors: Shogo Hiyama, Shinagawa (JP); Kentarou Yuasa, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/614,933

(22) Filed: Jun. 6, 2017

(65) Prior Publication Data

US 2017/0373584 A1    Dec. 28, 2017

(30) Foreign Application Priority Data

Jun. 27, 2016  (JP) .................. 2016-126942

(51) Int. Cl.
*H02M 1/08* (2006.01)
*H02M 3/337* (2006.01)
*H02M 3/158* (2006.01)
*H02M 1/00* (2006.01)

(52) U.S. Cl.
CPC ........... *H02M 1/08* (2013.01); *H02M 3/3378* (2013.01); *H02M 3/1584* (2013.01); *H02M 2001/007* (2013.01); *H02M 2001/0067* (2013.01); *H02M 2003/1586* (2013.01)

(58) Field of Classification Search
CPC ................ H02M 3/156; H02M 3/158; H02M 2001/007; H02M 3/1582; H02M 2003/1552; H02M 3/1584; H02M 2001/0067
See application file for complete search history.

(56) References Cited

U.S. PATENT DOCUMENTS

| | | | |
|---|---|---|---|
| 2009/0102449 A1* | 4/2009 | Chang | H02M 3/1582 323/311 |
| 2012/0081086 A1* | 4/2012 | Van Dijk | H02M 3/158 323/273 |
| 2016/0294290 A1* | 10/2016 | Tamura | H02M 1/08 |

FOREIGN PATENT DOCUMENTS

| | | |
|---|---|---|
| JP | 2005-108601 | 4/2005 |
| JP | 2015-53777 | 3/2015 |

* cited by examiner

*Primary Examiner* — Jue Zhang
*Assistant Examiner* — Lakaisha Jackson
(74) *Attorney, Agent, or Firm* — Staas & Halsey LLP

(57) ABSTRACT

A voltage control apparatus includes a boost converter configured to convert an input voltage to a voltage equal to or higher than a first voltage in an operative state and directly output the input voltage in an inoperative state, a buck-boost converter coupled with the boost converter in parallel and configured to convert the input voltage to a second voltage lower than the first voltage, a memory, and a processor coupled to the memory and configured to keep the buck-boost converter in the operative state, set the boost converter to the inoperative state when the input voltage is equal to or higher than the first voltage, and change the boost converter to the operative state when the input voltage is lower than the first voltage.

2 Claims, 14 Drawing Sheets

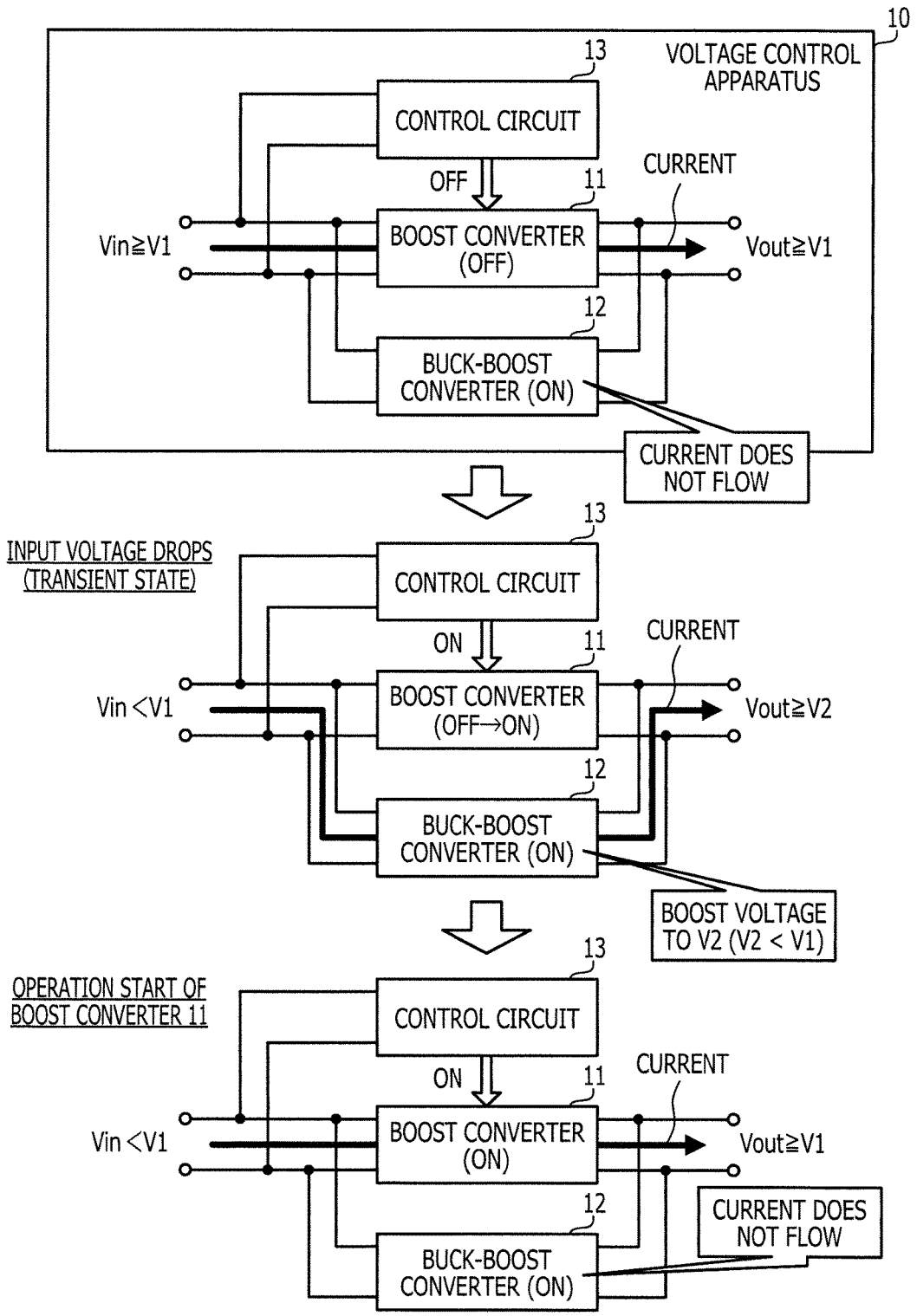

VOLTAGE CONTROL APPARATUS

CROSS-REFERENCE TO RELATED APPLICATION

This application is based upon and claims the benefit of priority of the prior Japanese Patent Application No. 2016-126942, filed on Jun. 27, 2016, the entire contents of which are incorporated herein by reference.

FIELD

The embodiments discussed herein are related to a voltage control apparatus and an information processing apparatus.

BACKGROUND

In a power source circuit that converts an input voltage supplied from a power supply system to a predetermined voltage, the input voltage sometimes drops abruptly due to a change of input voltage sources when a power outage occurs, or the like. In order to prepare such a situation, a power source circuit including a boost converter that boosts the input voltage is provided. Also, there is a problem in that if a boost converter is operated all the time, the transmission efficiency of the power deteriorates, or noise occurs. Accordingly, a proposal has been made of a power source circuit that stops the boost operation of the boost converter if the input voltage is equal to or higher than a predetermined voltage.

Also, as an example of a technique related to a power source circuit, a discharge lamp lighting device including a battery disposed in parallel with a boost converter is provided.

Related-art techniques are disclosed in Japanese Laid-open Patent Publication Nos. 2015-53777 and 2005-108601.

SUMMARY

According to an aspect of the invention, a voltage control apparatus includes a boost converter configured to convert an input voltage to a voltage equal to or higher than a first voltage in an operative state and directly output the input voltage in an inoperative state, a buck-boost converter coupled with the boost converter in parallel and configured to convert the input voltage to a second voltage lower than the first voltage, a memory, and a processor coupled to the memory and configured to keep the buck-boost converter in the operative state, set the boost converter to the inoperative state when the input voltage is equal to or higher than the first voltage, and change the boost converter to the operative state when the input voltage is lower than the first voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a configuration of a voltage control apparatus according to a first embodiment and an example of the operation thereof;

DESCRIPTION OF EMBODIMENTS

Figure 2A:
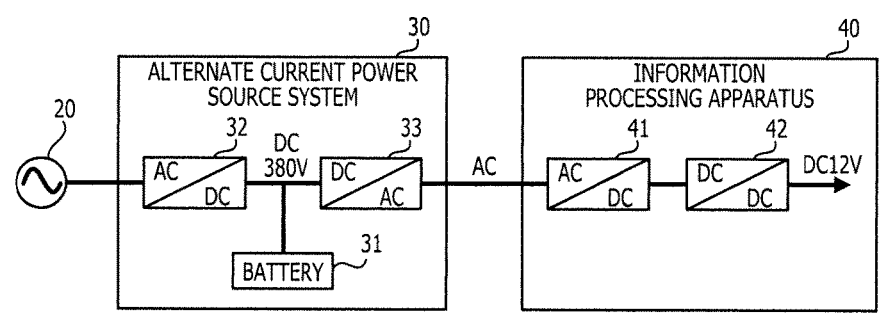
FIGS. 2A and 2B are first diagrams illustrating comparative examples of power supply systems.

When an operation start instruction is given to a boost converter in an inoperative state, it takes some time until the boost converter enables the output voltage to be boosted up to a predetermined voltage. Accordingly, if the operation of the boost converter is started in accordance with a drop of the input voltage, there is a possibility that the output voltage temporarily drops significantly before the output voltage of the boost converter is boosted to the predetermined voltage. On the other hand, if the boost converter is operated all the time in preparation for an input voltage drop, there is a problem in that the occurrence of power loss is inevitable, and thus the operation is inefficient.

According to an aspect of the present disclosure, it is desirable to provide a voltage control apparatus and an information processing apparatus that efficiently reduce a drop in the output voltage, which is caused by a drop in the input voltage.

In the following, a description will be given of embodiments of the present disclosure with reference to the drawings.

First Embodiment

FIG. 1 is an example of a configuration of a voltage control apparatus according to a first embodiment and an example of operation. A voltage control apparatus 10 illustrated in FIG. 1 includes a boost converter 11, a buck-boost converter 12, and a control circuit 13.

The boost converter 11 is capable of changing an operative state and an inoperative state in accordance with an instruction from the control circuit 13. In the following, when the boost converter 11 is in an operative state, the boost converter 11 is referred to be on, and when the boost converter 11 is in an inoperative state, the boost converter 11 is referred to be off. When the boost converter 11 is in the on state, the boost converter 11 boosts an input voltage Vin to a voltage equal to or higher than a predetermined voltage V1(note that V1>0). On the other hand, when the boost converter 11 is in an off state, the boost converter 11 does not perform the boost operation, and directly outputs the input voltage Vin.

The buck-boost converter 12 is coupled in parallel with the boost converter 11. The buck-boost converter 12 changes the input voltage Vin to a voltage V2 lower than the voltage V1 (note that V2>0). Also, such operation by the buck-boost converter 12 is performed under the control of the control circuit 13 both in the case where the boost converter 11 is on and in the case where the boost converter 11 is off.

The control circuit 13 continues to keep the buck-boost converter 12 operating. Together with this, if the input voltage Vin is equal to or higher than the voltage V1, the control circuit 13 sets the boost converter 11 off and monitors the input voltage Vin. If the input voltage Vin becomes lower than the voltage V1, the control circuit 13 changes the boost converter 11 to on.

In the following, a description will be given of an example of operation of the voltage control apparatus 10 in accordance with the state of the input voltage Vin.

If the input voltage Vin is equal to or higher than the voltage V1, as illustrated in the upper part in FIG. 1, the control circuit 13 sets the boost converter 11 off. In this state, a voltage input from the boost converter 11 is directly output, and thus the output voltage Vout of the voltage control apparatus 10 becomes equal to or higher than the voltage V1. In this manner, in a state in which boosting is needless, the boost converter 11 is set off, and thus excessive power becomes unconsumed. Accordingly, it is possible to reduce the power loss by the entire apparatus. On the other hand, although the buck-boost converter 12 is set on by the control circuit 13, since the input voltage Vin to the boost converter 11 is lower than the voltage V2, which is output from the buck-boost converter 12, and thus the current does not flow through the buck-boost converter 12. Accordingly, the power loss by the buck-boost converter 12 is small.

Next, if the input voltage Vin becomes lower than the voltage V1 from the above-described state, as illustrated in the middle part in FIG. 1, the control circuit 13 changes the boost converter 11 to on. However, it is not possible for the boost converter 11 to boost the input voltage to a voltage equal to or higher than the voltage V1 immediately upon receipt of a change instruction from the control circuit 13. Accordingly, the output voltage of the boost converter 11 temporarily drops with a drop of the input voltage Vin. On the other hand, the buck-boost converter 12 coupled in parallel with the boost converter 11 is kept on. Accordingly, if the input voltage Vin drops, a current flows through the buck-boost converter 12. The output voltage Vout of the voltage control apparatus 10 is kept equal to or higher than the voltage V2 by the boost operation of the buck-boost converter 12.

After that, the start of the boost converter 11 is completed, and the output voltage Vout of the voltage control apparatus 10 is boosted to a voltage equal to or higher than the voltage V1 by the boost operation of the boost converter 11. In this state, as illustrated by the lower part in FIG. 1, a current does not flow through the buck-boost converter 12 because the output voltage of the buck-boost converter 12 is lower than the voltage output from the boost converter 11. Accordingly, the power loss by the buck-boost converter 12 is small.

As described above, in the transient state until the completion of starting the boost converter 11, it is possible for the voltage control apparatus 10 to keep the output voltage Vout of the voltage control apparatus 10 equal to or higher than the voltage V2, and thus to avoid excessive falling of the output voltage Vout. Also, in the state in which the input voltage Vin is equal to or higher than the voltage V1, it is possible to reduce the power loss of the boost converter 11 by stopping the boost operation of the boost converter 11. Further, in the state in which the input voltage Vin is equal to or higher than the voltage V1, or in the state in which the output voltage Vout is equal to or higher than the voltage V1 by the operation of the boost converter 11, a current does not flow through the buck-boost converter 12, and thus it is possible to reduce a power loss of the buck-boost converter 12.

In this manner, in the voltage control apparatus 10, in the transient state from when the boost converter 11 is changed to on to the start of the boost operation, the output voltage is allowed to drop to a certain voltage lower than the steady voltage. Thereby, it is possible to reduce more power loss than in the case of keeping on the boost converter 11 all the time, which boosts the voltage up to the steady voltage. Accordingly, with the voltage control apparatus 10, it is possible to efficiently reduce a drop in the output voltage Vout, which is caused by a drop in the input voltage Vin.

Second Embodiment

Next, a description will be given of an information processing apparatus provided with a power source circuit including the voltage control apparatus 10 in FIG. 1 as a second embodiment. In the following description, first a description will be given of a comparative example of a power supply system that supplies power to an information processing apparatus with reference to FIGS. 2A and 2B and FIGS. 3A and 3B. After that, a description will be given of an information processing apparatus according to the present embodiment.

Figure 2B:
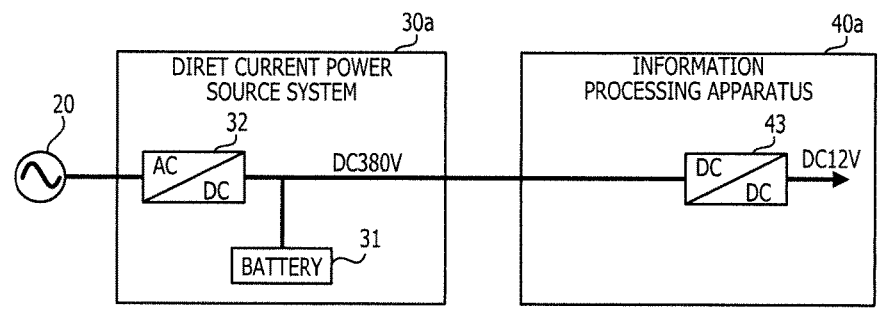

FIGS. 2A and 2B are first diagrams of comparative examples of power supply systems. FIG. 2A illustrates an example of an alternate current (AC) power supply system, and FIG. 2B illustrates an example of a high voltage direct current (HVDC) power supply system.

The power supply systems illustrated in FIGS. 2A and 2B are installed, for example, in a data center. In recent years, various kinds of data are electronized and come to be handled on a computer. Accordingly, the amount of data handled by a business organization is continuing to increase. A data center used by such a business organization has a tendency to be provided with a large number of information and communication technology (ICT) devices, such as servers, storage devices, and the like. Thus, the power for operating the large number of ICT devices and the power for cooling the devices are increasing. Accordingly, power saving becomes a challenge.

Information processing apparatuses 40 and 40a illustrated in FIGS. 2A and 2B, respectively are examples of ICT devices installed in a data center. The AC power supply system illustrated in FIG. 2A is a power supply system that has been generally used for a long time, and that supplies power supplied from an alternate current power source 20 to the information processing apparatus 40 via an alternate current power source system 30 in AC without change. Also, the alternate current power source system 30 includes a battery 31 for continuing to supply power at the time of power outage, or the like. Accordingly, the alternate current power source system 30 includes an AC/DC converter 32 that once converts the alternate current power from the alternate current power source 20 to a direct current power, and a DC/AC converter 33 that converts the converted direct current power to an alternate current power. The DC/AC converter 33 converts the direct current power supplied either from the AC/DC converter 32 or the battery 31 to an alternate current power and outputs the power.

The information processing apparatus 40 includes an AC/DC converter 41 that converts the supplied alternate current power to a direct current power, and a DC/DC converter 42 that converts the converted direct current power to a predetermined voltage (for example, 12V).

On the other hand, in the HVDC power supply system, the power is supplied to the information processing apparatus in direct current without a change. Thereby, the direct current power does not have to be changed to an alternate current power, and thus it is possible to reduce the power loss. Also, by keeping the direct current power to be transmitted at a high voltage, it is possible to reduce the current at transmission time, and thus to reduce the power loss due to the generation of heat, or the like. By using the HVDC power supply system, for example, it is said that the power loss is allowed to be reduced by a few percent to 20 percent in the entire data center.

In the example in FIG. 2B, the direct current power source system 30a includes the battery 31 and the AC/DC converter 32, but does not include the DC/AC converter 33, and outputs a direct current power without change. At this time, the output voltage is a high voltage, for example, 380V. The information processing apparatus 40a that is supplied power from the direct current power source system 30a includes a DC/DC converter 43 that converts the input voltage to a predetermined voltage (for example, 12V), but does not have to include an AC/DC converter.

Figure 3A:
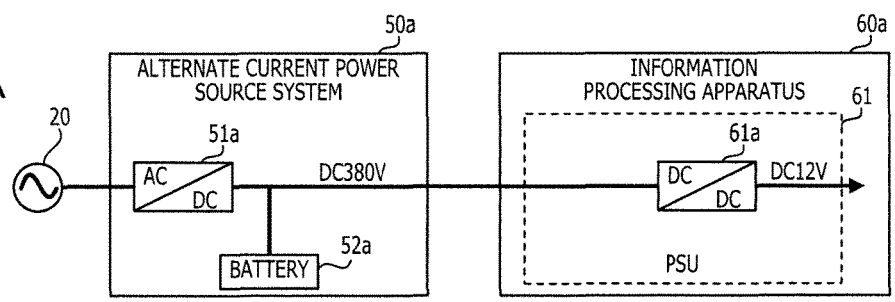
FIGS. 3A and 3B are second diagrams illustrating comparative examples of power supply systems.
Figure 3B:
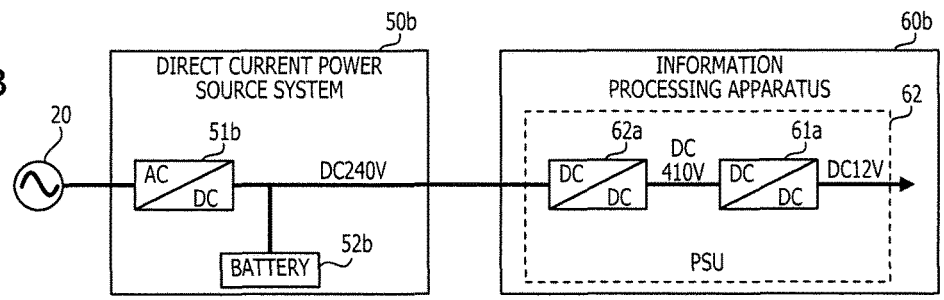

FIGS. 3A and 3B are second diagrams of comparative examples of power supply systems. In the HVDC power supply system, the rated voltage for a direct voltage supplied to an ICT device is not unified at present. Currently, roughly speaking, either a relatively high voltage of 350 V to 380 V or a relatively low voltage of 240 V is mainly used. The rated voltages between them differ nearly two times, and thus the configurations of the power supply units (PSUs) that support input of the individual voltages often differ from the viewpoint of efficiency.

FIG. 3A illustrates an example of the HVDC power supply system including a PSU that supports the input voltage of 350 V to 380 V. A direct current power source system 50a includes an AC/DC converter 51a and a battery 52a. The AC/DC converter 51a or the battery 52a outputs a direct current voltage of 380V, for example. A PSU 61 in an information processing apparatus 60a includes a DC/DC converter 61a that converts the supplied direct current voltage of 380 V to 12 V, for example.

On the other hand, FIG. 3B illustrates an example of the HVDC power supply system including a PSU that supports an input voltage of 240 V. A direct current power source system 50b includes an AC/DC converter 51b and a battery 52b. The AC/DC converter 51b or the battery 52b outputs a direct current voltage of 240 V.

Also, a PSU 62 in an information processing apparatus 60b includes the DC/DC converter 61a that converts the input voltage to 12 V in the same manner as the PSU 61 in the information processing apparatus 60a. However, if the PSU 62 uses the input voltage of 240 V without change, the current value is high and thus disadvantages occur, for example, the parts in the PSU 62 increases in size, energy loss due to heating, or the like becomes large. Accordingly, the PSU 62 further includes a DC/DC converter (boost converter) 62a that boosts the input voltage of 240 V to 410 V, for example. In the PSU 62, the DC/DC converter 61a decreases the direct current voltage boosted by the DC/DC converter 62a to 12 V, and outputs the voltage.

Here, as described above, the rated voltage of the HVDC power supply system is not unified at present. Accordingly, it is desirable to develop a PSU that supports a wide range of input voltage from a relatively high voltage (350 V to 380 V) to a relatively low voltage (240 V). However, in order to realize such a PSU, it is desirable to dispose two stages of voltage conversion circuits as the PSU 62 illustrated in FIG. 3B. With such a configuration, there is a problem in that a power loss occurs due to an increase in the number of conversion stages of voltage, and the efficiency deteriorates. In particular, in a state in which a voltage of 350 V to 380 V is input, in the first voltage conversion circuit, although boosting voltage does not have to be performed, a power loss due to switching operation occurs.

Thus, in an information processing apparatus according to the second embodiment, a PSU including two stages of voltage conversion circuits is provided as the information processing apparatus 60b in FIG. 3B, and a function of stopping the boost operation of the first stage voltage conversion circuit is added to the PSU. Thereby, a power loss reduction is attempted. In addition to this, in the information processing apparatus according to the second embodiment, the first stage voltage conversion circuit in the PSU is also used as a voltage boosting mechanism when the input voltage is abnormally low.

Figure 4:
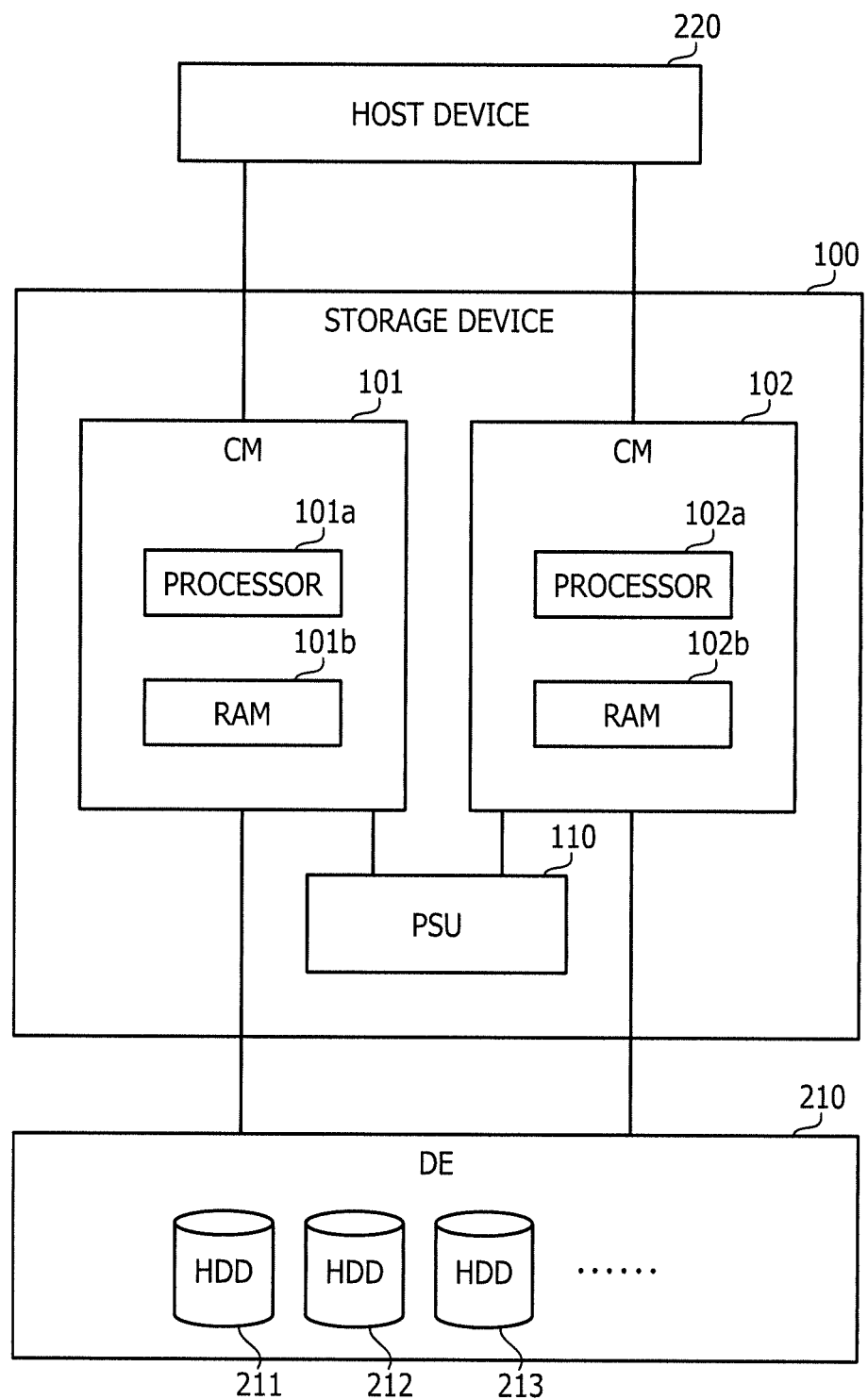
FIG. 4 is a diagram illustrating an example of a configuration of a storage device, which is an example of an information processing apparatus according to a second embodiment.

FIG. 4 is a diagram illustrating an example of a configuration of a storage device, which is an example of the information processing apparatus according to the second embodiment. A storage device 100 illustrated in FIG. 4 includes controller modules (CMs) 101 and 102, and a PSU 110. Also, a drive enclosure (DE) 210 and a host device 220 are coupled to the CMs 101 and 102.

The CMs 101 and 102 are storage control devices that control accesses to storage devices mounted in the DE 210 upon request from the host device 220. As storage devices to be access controlled, the DE 210 is mounted with a plurality of HDDs 211, 212, and 213, for example.

In this regard, the CM 101 is realized as a computer including, for example, a processor 101a, a random access memory (RAM) 101b, and the like. The CM 102 is also realized as a computer including a processor 102a, a RAM 102b, and the like in the same manner. Also, for example, the CMs 101 and 102 may access the storage devices individually by a separate request from the host device. Alternatively, one of the CMs 101 and 102 may operate as an operational system, and the other of the CMs 101 and 102 may operate as a standby system.

The PSU 110 supplies power to the CMs 101 and 102 based on the power supplied from the outside. The PSU 110 supports input of a direct current power transmitted in the HVDC power supply system.

Figure 5:
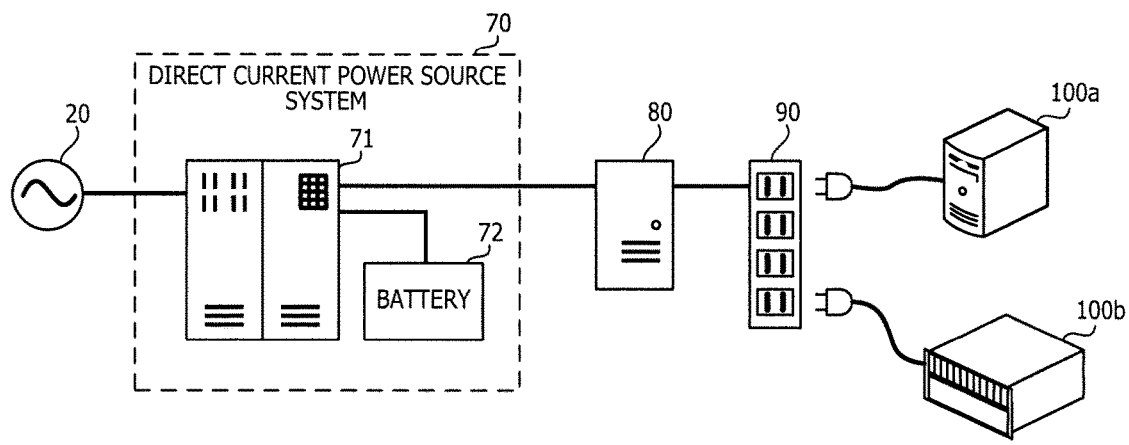
FIG. 5 is a diagram illustrating an example of a configuration of a power supply system that supplies power to the storage device.

FIG. 5 is a diagram illustrating an example of a configuration of a power supply system that supplies power to the storage device. The power supply system illustrated in FIG. 5 includes an alternate current power source 20, a direct current power source system 70, an HVDC distribution board 80, and a power distribution unit 90.

The direct current power source system 70 includes a rectifier 71 and a battery 72. The rectifier 71 converts the alternate current power supplied from the alternate current power source 20 to a direct current power and rectifies the converted direct current power. Also, the rectifier 71 outputs the rectified direct current power or the direct current power output from the battery 72 by changing the powers. For example, in a state in which alternate current power is supplied from the alternate current power source 20, the rectifier 71 outputs the direct current power produced by converting this alternate current power and rectifying the current. If the supply level of the alternate current power drops, the rectifier 71 changes the output power to the power from the battery 72. The battery 72 supplies the direct current power to the rectifier 71.

The HVDC distribution board 80 distributes the power output from the direct current power source system 70. Also, the HVDC distribution board 80 is mounted with safety devices, for example, various breakers, and the like. Various information processing apparatuses 100a, 100b, . . . , including the storage device 100 are coupled to the power distribution unit 90. Specifically, the respective power source plugs of the information processing apparatuses 100a, 100b, . . . , are coupled to the power distribution unit 90. The power distribution unit 90 supplies the direct current power supplied from the direct current power source system 70 via the HVDC distribution board 80 to the coupled information processing apparatuses 100a and 100b, . . . .

In this regard, in a power supply system having the above-described configuration, the output voltage from the direct current power source system 70 may be possible to be a relatively high voltage (350 V to 380 V) and a relatively low voltage (240 V). Also, in the former case, when the output voltage of the rectifier 71 is changed to the output voltage of the battery 72, the output voltage of the rectifier 71 sometimes becomes a voltage lower than 350 V to 380 V. Further, if the power supplied to the rectifier 71 from the outside is not a normal alternate current power source 20, but the power based on natural energy, such as solar power generation, or the like, the output voltage of the rectifier 71 sometimes becomes a voltage lower than 350 V to 380 V.

Next, a description will be given of the PSU 110 of the storage device 100.

Figure 6:
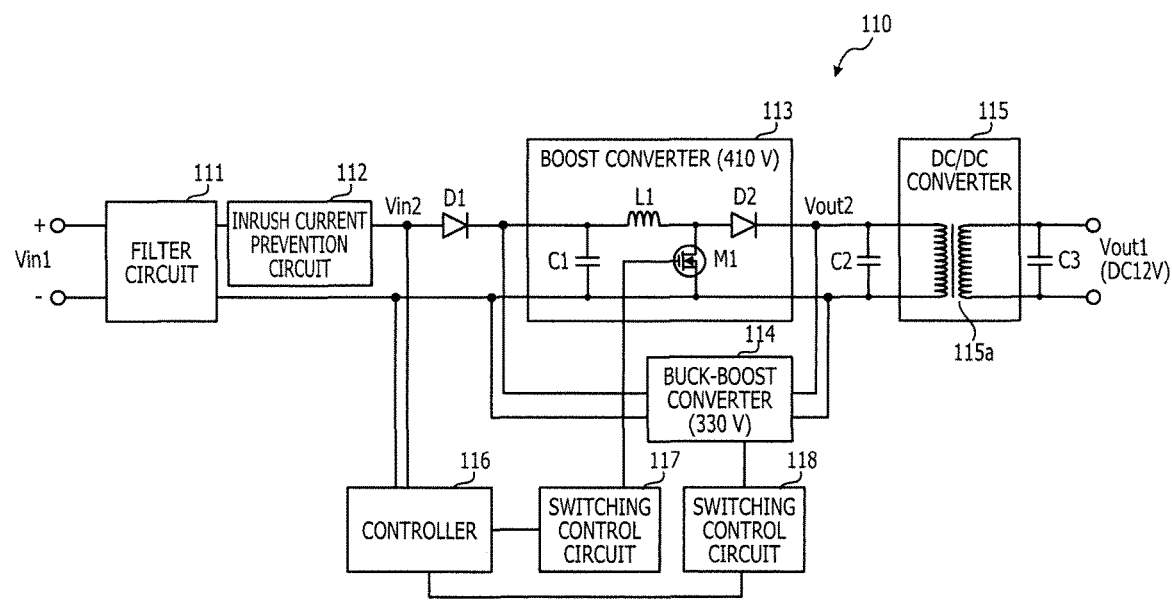
FIG. 6 is a diagram illustrating an example of an internal configuration of a PSU.

FIG. 6 is a diagram illustrating an example of an internal configuration of the PSU. In the PSU 110, a filter circuit 111, a boost converter 113, and a DC/DC converter 115 are coupled in series. Also, a buck-boost converter 114 is coupled in parallel with the boost converter 113. Further, the PSU 110 includes an inrush current prevention circuit 112, a controller 116, and switching control circuits 117 and 118. In this regard, the boost converter 113, the buck-boost converter 114, and the controller 116 are examples of the boost converter 11, the buck-boost converter 12, and the control circuit 13 in FIG. 1, respectively.

The filter circuit 111 removes dispensable input noise. The inrush current prevention circuit 112 and a diode D1 are coupled in series to a signal line between the filter circuit 111 and the boost converter 113. The inrush current prevention circuit 112 inhibits the inrush current from the filter circuit 111. The diode D1 avoids a reverse current flow from the boost converter 113 to the direction of the inrush current prevention circuit 112.

The boost converter 113 is a chopper-type boost converter and includes a choke coil L1, a switching element M1, a capacitor C1, and a diode D2. The choke coil L1 and the diode D2 are coupled to the output side of the diode D1 in series. The diode D2 avoids a reverse current flow to the choke coil L1 and the switching element M1.

The switching element M1 is an n-channel metal-oxide semiconductor field-effect transistor (MOSFET). The both ends of the capacitor C1 are coupled to the both ends of the switching element M1, respectively via the choke coil L1. The drain of the switching element M1 is coupled to a connection end of the choke coil L1 and the diode D2, and the source of the switching element M1 is coupled to the ground side of the capacitor C1. The gate of the switching element M1 is coupled to the switching control circuit 117. The switching control circuit 117 controls the voltage input to the gate of the switching element M1 under the control of the controller 116 so as to switch on and off to the switching element M1.

In the boost converter 113, when the switching element M1 is on, the output voltage is boosted higher than the input voltage by the energy stored in the choke coil L1. The controller 116 controls the switching interval of the switching element M1 via the switching control circuit 117 so as to keep the output voltage of the boost converter 113 to be a fixed voltage of 410 V.

The buck-boost converter 114 is a chopper-type boost converter having the same configuration as that of the boost converter 113. The switching control circuit 118 controls the voltage input to the gate of the switching element (not illustrated in FIG. 6) of the buck-boost converter 114 under the control of the controller 116 so as to change on and off of the switching element. The controller 116 controls the switching interval of the switching element of the buck-boost converter 114 via the switching control circuit 118 so as to keep the output voltage of the buck-boost converter 114 to be a fixed voltage of 330 V.

The output ends of the buck-boost converter 114 are put together with the output ends of the boost converter 113. The DC/DC converter 115 is coupled to the output side of the boost converter 113 and the buck-boost converter 114 in series. The DC/DC converter 115 includes a transformer 115a, and decreases the input voltage to 12 V and outputs the voltage. The input voltage to the DC/DC converter 115 is smoothed by a capacitor C2. Also, the output voltage from the DC/DC converter 115 is smoothed by a capacitor C3.

In this regard, the output voltage of the buck-boost converter 114 is determined to be a value lower than the output voltage (410 V) of the boost converter 113, and further that makes the output voltage of the DC/DC converter 115 not lower than a predetermined value (for example, 12 V).

The controller 116 further has a function of detecting the input voltage of the boost converter 113 and the buck-boost converter 114 and turning on and off the boost operation of the boost converter 113 based on the detection result. When the controller 116 turns off the boost operation of the boost converter 113, the controller 116 stops the switching operation of the switching element M1 of the boost converter 113.

In this regard, the controller 116 includes, for example, a processor and a memory, and a firmware program stored in the memory is executed by the processor so that the controller 116 is realized as a microcomputer that performs various kinds of processing.

Next, a description will be given of the details of on-off control of the boost converter 113 by the controller 116. In this regard, "turning on the boost converter 113" means starting the boost operation of the boost converter 113. Also, "turning off the boost converter 113" means stopping the boost operation of the boost converter 113. As described above, this is performed by stopping the switching operation of the switching element M1 of the boost converter 113.

The controller 116 performs on-off control of the boost converter 113 so as to handle the following four states based on the detection result of the input voltage of the boost converter 113 and the buck-boost converter 114.

(a) The input voltage is fixed in the range from 350 V to 380 V.

(b) The input voltage is fixed at 240 V.

(c) The input voltage drops from the range from 350 V to 380 V.

(d) The input voltage recovers from the dropped state to the range from 350 V to 380 V.

First, a description will be given of control in the state (a) with reference to FIG. 7.

Figure 7:
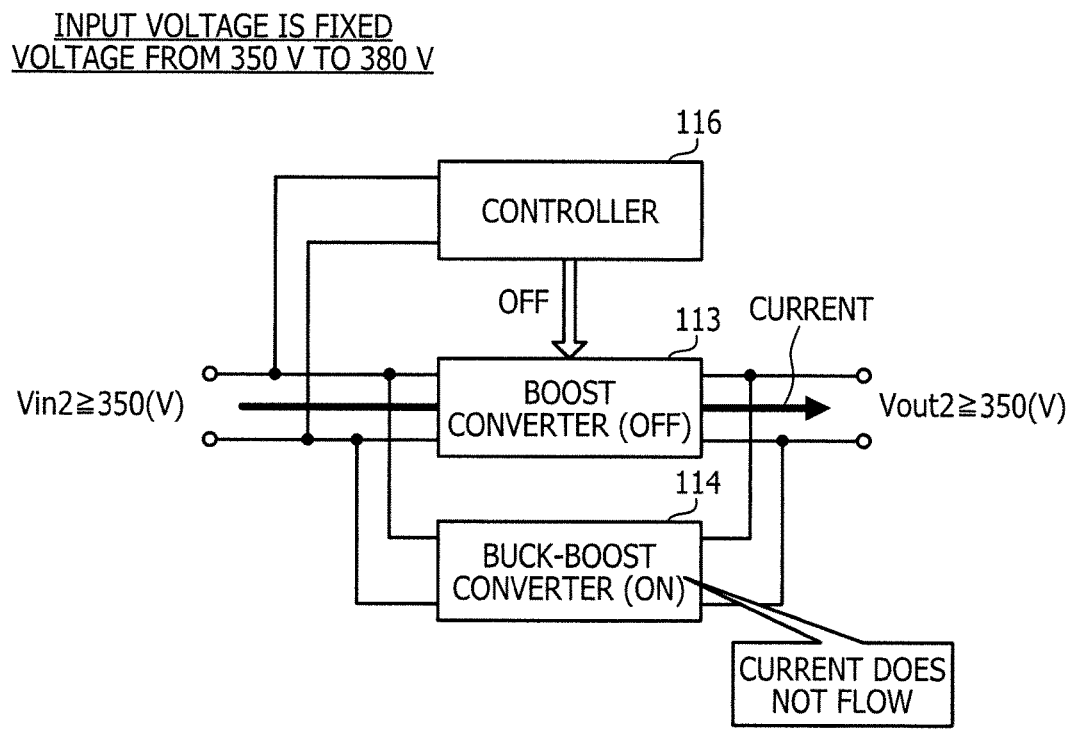
FIG. 7 is a diagram illustrating control in the case where an input voltage is a fixed voltage from 350 V to 380 V.

FIG. 7 is a diagram illustrating control in the case where an input voltage is a fixed voltage of 350 V to 380 V. In this regard, in FIG. 7, the illustrations of the switching control circuits 117 and 118, the diode D1, and the like are omitted. Also, the input voltage Vin2 is the voltage at the output stage of the inrush current prevention circuit 112, which is detected by the controller 116. This is almost equal to the input voltage Vin1 to the PSU 110.

Immediately after the PSU 110 is started, if the input voltage Vin2 is equal to or higher than 350 V, the controller 116 determines that a stable power source voltage of 350 V to 380 V is supplied. In this case, as illustrated in FIG. 7, the controller 116 turns off the boost converter 113. At this time, the boost converter 113 outputs a voltage equal to or higher than the input 350 V without change. Thereby, the output voltage Vout2 is kept equal to or higher than 350 V. In this manner, in a state in which boosting voltage is dispensable, the boost converter 113 is turned off so that excessive power becomes not consumed, and thus it is possible to reduce the power loss in the PSU 110.

Also, the buck-boost converter 114 is kept on all the time regardless of the on and off of the boost converter 113. In the state illustrated in FIG. 7, the input voltage of the buck-boost converter 114 becomes higher than the output voltage of the buck-boost converter 114, and thus a current does not flow through the buck-boost converter 114. Accordingly, while the buck-boost converter 114 is kept in the on state, the power loss by the buck-boost converter 114 is kept small.

Next, a description will be given of control in the state (b) with reference to FIG. 8.

Figure 8:
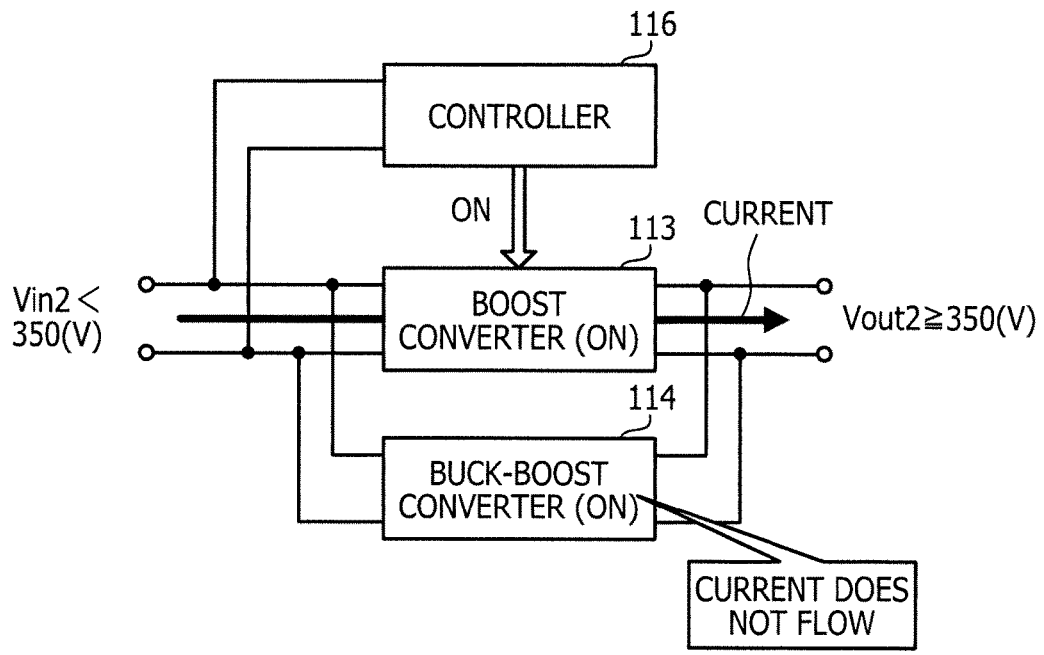
FIG. 8 is a diagram illustrating control in the case where an input voltage is a fixed voltage of 240 V.

FIG. 8 is a diagram illustrating control in the case where the input voltage is a fixed voltage of 240 V. In this regard, in FIG. 8, the illustrations of the switching control circuits 117 and 118, the diode D1, and the like are omitted in the same manner as FIG. 7.

If the input voltage Vin2 is lower than 350 V immediately after the PSU 110 has been started, the controller 116 determines that a stable power source voltage of 240 V is supplied. In this case, as illustrated in FIG. 8, the controller 116 turns on the boost converter 113. The boost converter 113 boosts the input voltage of 240 V to a voltage equal to or higher than 350 V (410 V in the present embodiment) and outputs the voltage. Thereby, the current value output from the boost converter 113 becomes small so that an increase in the size of the parts of the output side (for example, the capacitor C2 and the DC/DC converter 115) of the boost converter 113, and the occurrence of the power loss by heating from those parts, and the like are inhibited.

Also, while the buck-boost converter 114 is kept on, in the state illustrated in FIG. 8, the output voltage of the buck-boost converter 114 becomes lower than the output voltage of the boost converter 113 so that a current does not flow through the buck-boost converter 114. Accordingly, while the buck-boost converter 114 is in the on state, the power loss by the buck-boost converter 114 is kept low.

Next, a description will be given of control in the state (c). As described in state (c), a situation in which the input voltage drops from the range of 350 V to 380 V may occur, for example, in the following cases. For example, one case is when the output voltage of the rectifier 71 is changed to the output voltage of the battery 72. Alternatively, another case is when the power supplied to the rectifier 71 from the outside is not the power from the normal alternate current power source 20, but the power based on natural energy, such as solar power generation, or the like.

As illustrated in FIG. 7, if the input voltage Vin2 is equal to or higher than 350 V, the boost converter 113 is kept off. If the input voltage Vin2 becomes lower than 350 V from this state, the controller 116 turns on the boost converter 113, and causes the boost converter 113 to perform boost operation such that the output voltage Vout2 does not drop. In this manner, in the present embodiment, the boost converter 113 disposed for supporting the input voltage of 240 V is also used for coping with a voltage drop at the time of the voltage input of 350 V to 380 V. Thereby, it is possible to effectively use the boost converter 113.

However, even if the boost converter 113 is changed from off to on, it is not possible to start the boost operation until the starting is completed. Accordingly, immediately after the boost converter 113 is turned on, the output voltage of the boost converter 113 temporarily drops with a drop in the input voltage.

Figure 9:
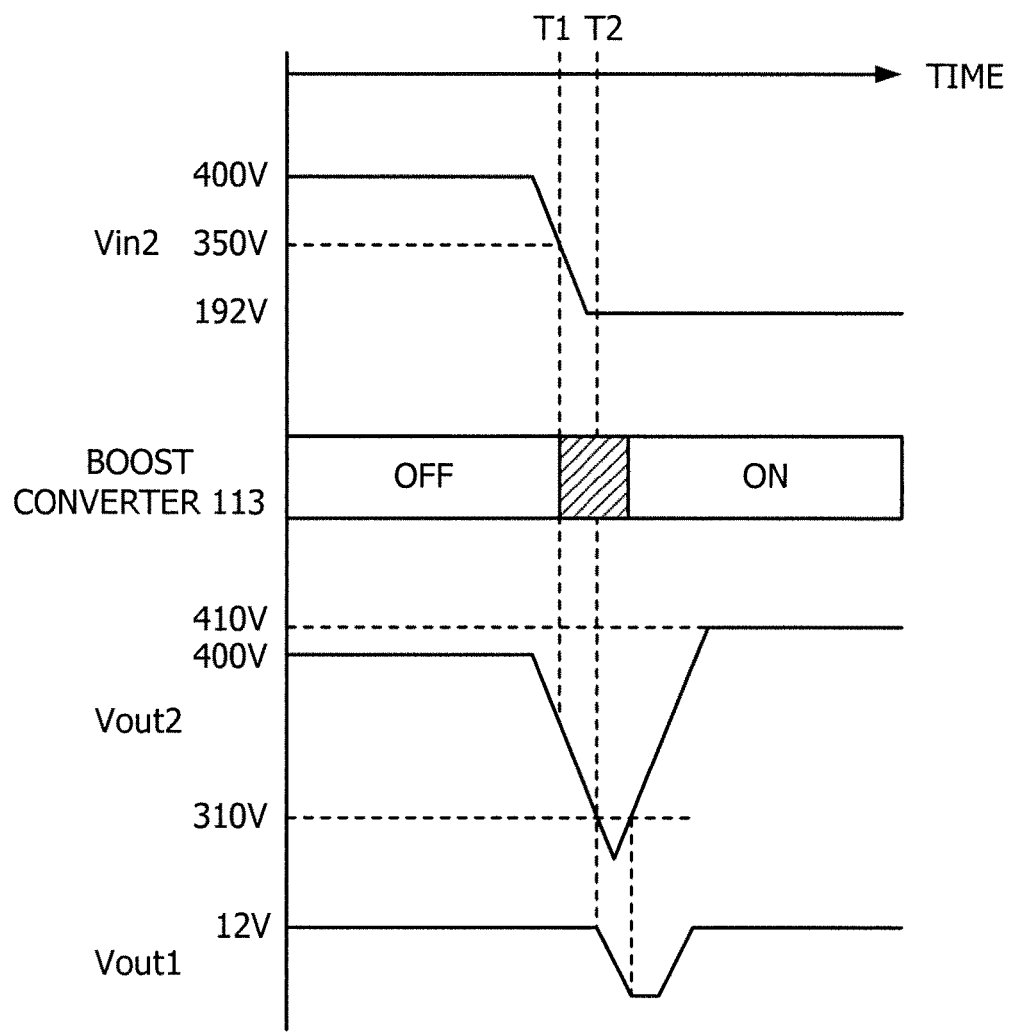
FIG. 9 is a diagram illustrating an example of a voltage change in the case where a buck-boost converter having an output of 330 V is not coupled.

FIG. 9 is a diagram illustrating an example of a voltage change in the case where a buck-boost converter having an output of 330 V is not coupled. FIG. 9 illustrates an example of the case where the input voltage Vin2 drops from 400 V to 192 V.

As illustrated in FIG. 9, it is assumed that the input voltage Vin2 drops from 400 V and becomes lower than 350 V at timing T1. The controller 116 detects this voltage drop and changes the boost converter 113 from off to on. However, it is not possible for the boost converter 113 to the boost operation up to 410 V until the starting is completed. In this regard, the shaded area in FIG. 9 indicates a transient state in which starting of the boost converter 113 is not completed.

Here, it is thought that the buck-boost converter 114 having the output of 330 V is not coupled tentatively. In this case, until the boost operation of the boost converter 113 is started, the output voltage Vout2 drops. For example, if it is assumed that the input voltage that makes it difficult for the DC/DC converter 115 to output the 12 V voltage is 310 V, the output voltage Vout2 drops lower than or equal to 310 V at timing T2, and the output voltage Vouti from the PSU 110 starts to drop. In this manner, even if the boost converter 113 is changed to on, there is a possibility that the output voltage Vout1 of the PSU 110 is temporarily not kept at the rated voltage of 12 V.

On the other hand, in the present embodiment, the buck-boost converter 114, which is on all the time, is coupled to the boost converter 113 in parallel so that the occurrence of the situation in which the output voltage Vout1 drops as described above is avoided.

Figure 10:
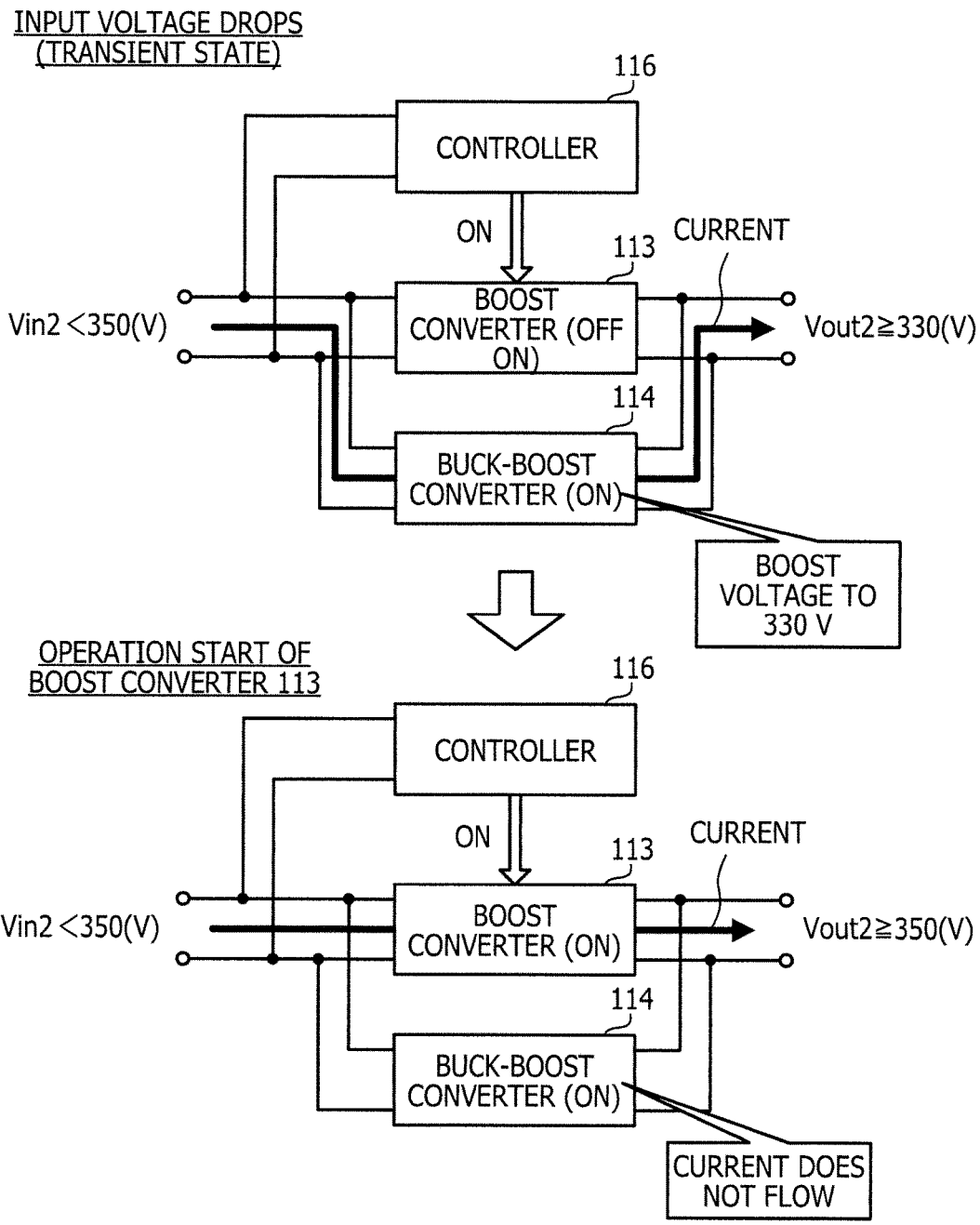
FIG. 10 is a diagram illustrating control in the case where an input voltage dropped.

FIG. 10 is a diagram illustrating control in the case where an input voltage has dropped. The upper part in FIG. 10 illustrates the case where the input voltage has dropped from the state (a) in which the input voltage is changed from the range of 350 V to 380 V to a voltage lower than 350 V. If the controller 116 detects that the input voltage Vin2 becomes lower than 350 V, the controller 116 changes the boost converter 113 from off to on. However, in the transient state up until the boost operation of the boost converter 113 is started, the output voltage Vout2 drops.

On the other hand, if the input voltage Vin2 has become lower than 330 V and the output voltage of the buck-boost converter 114 is going to be lower than 330 V, the buck-boost converter 114 that has been kept on starts the boost operation under the control of the controller 116. At this time, a current flows through the buck-boost converter 114, and thus the buck-boost converter 114 boosts the input voltage Vin2 to 330 V. Thereby, the output voltage Vout2 is kept equal to or higher than 330 V, and an excessive drop of the output voltage Vout1 of the PSU 110 is avoided.

After that, when the starting of the boost converter 113 is completed, and the boost converter 113 has boosted the input voltage Vin2 to a voltage higher than 330 V, a current flows through the boost converter 113 and a current does not flow through the buck-boost converter 114 as illustrated in the lower part in FIG. 10. The output voltage Vout2 is kept a voltage equal to or higher than 350 V by the boost operation of the boost converter 113.

Figure 11:
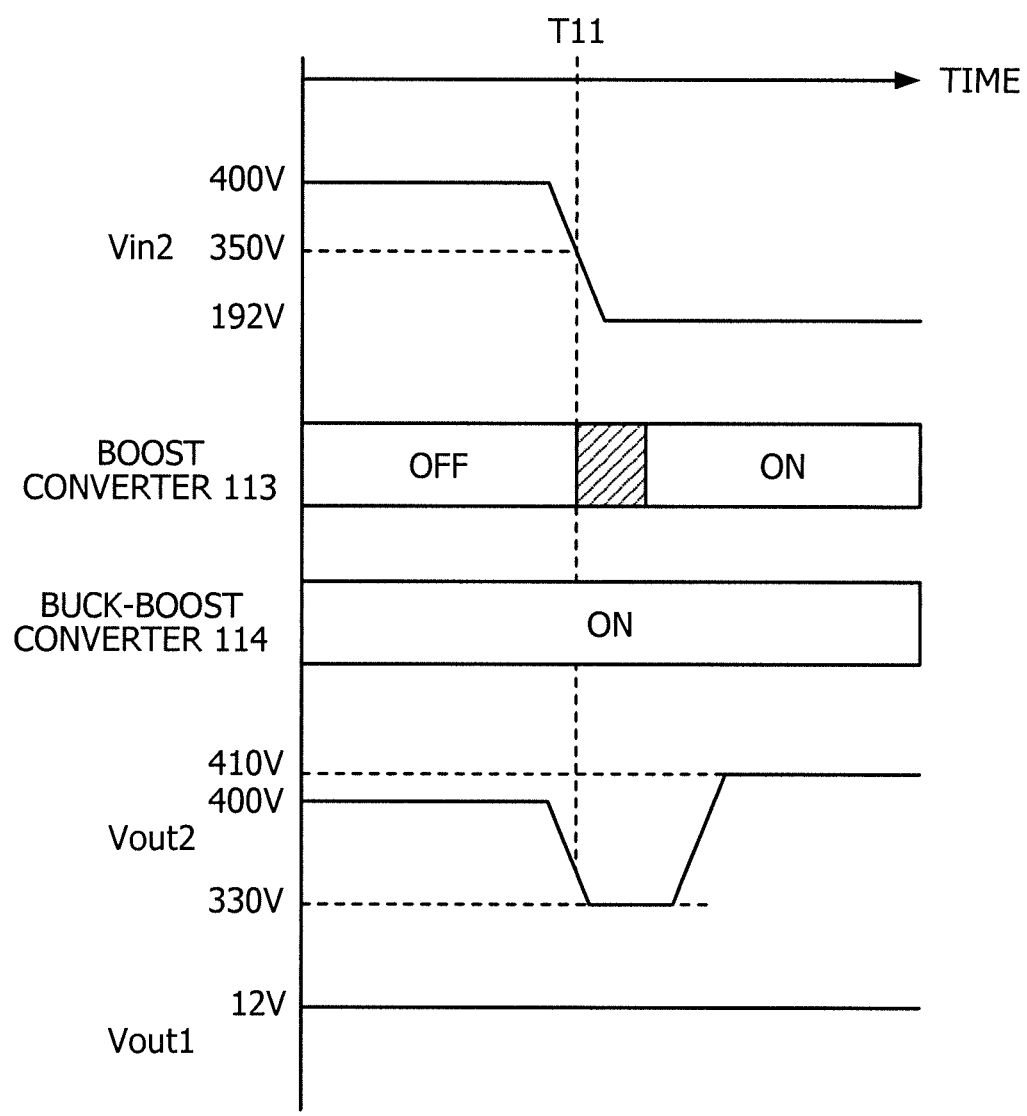
FIG. 11 is a diagram illustrating an example of a voltage change in the case where an input voltage dropped in the second embodiment.

FIG. 11 is a diagram illustrating an example of a voltage change in the case where the input voltage dropped in the second embodiment. FIG. 11 illustrates an example of the case where the input voltage Vin2 drops from 400 V to 192 V in the same manner as in FIG. 9.

As illustrated in FIG. 11, it is assumed that the input voltage Vin2 has dropped from 400 V and has become a voltage lower than 350 V at timing T11. The controller 116 detects this voltage drop and changes the boost converter 113 from off to on. It is not possible for the boost converter 113 to start boost operation up to 410 V until the starting is completed. However, the buck-boost converter 114 that is coupled in parallel with the boost converter 113 is kept on, and if the input voltage Vin2 becomes lower than 330 V, the input voltage Vin2 is boosted up to 330 V by the buck-boost converter 114. As a result, the output voltage Vout1 of the PSU 110 is kept at 12 V.

With the above-described control illustrated in FIG. 10 and FIG. 11, even if the input voltage Vin2 becomes lower than 350 V, it is possible to keep the output voltage Vout2 at a voltage equal to or higher than 330 V. Thereby, it is possible to avoid a drop of the output voltage Vout1 of the PSU 110, and thus to avoid malfunction in a load circuit to which the power is supplied from the PSU 110.

In this regard, although not illustrated in the figure, in the case where the input voltage further drops by a change to the battery 72, or the like from the state (b), the controller 116 keeps the boost converter 113 on, and causes the boost converter 113 to continue to perform the boost operation. Thereby, it is possible to avoid a drop in the output voltage Vout1.

Next, a description will be given of the control by the PSU 110 with reference to a flowchart.

Figure 12:
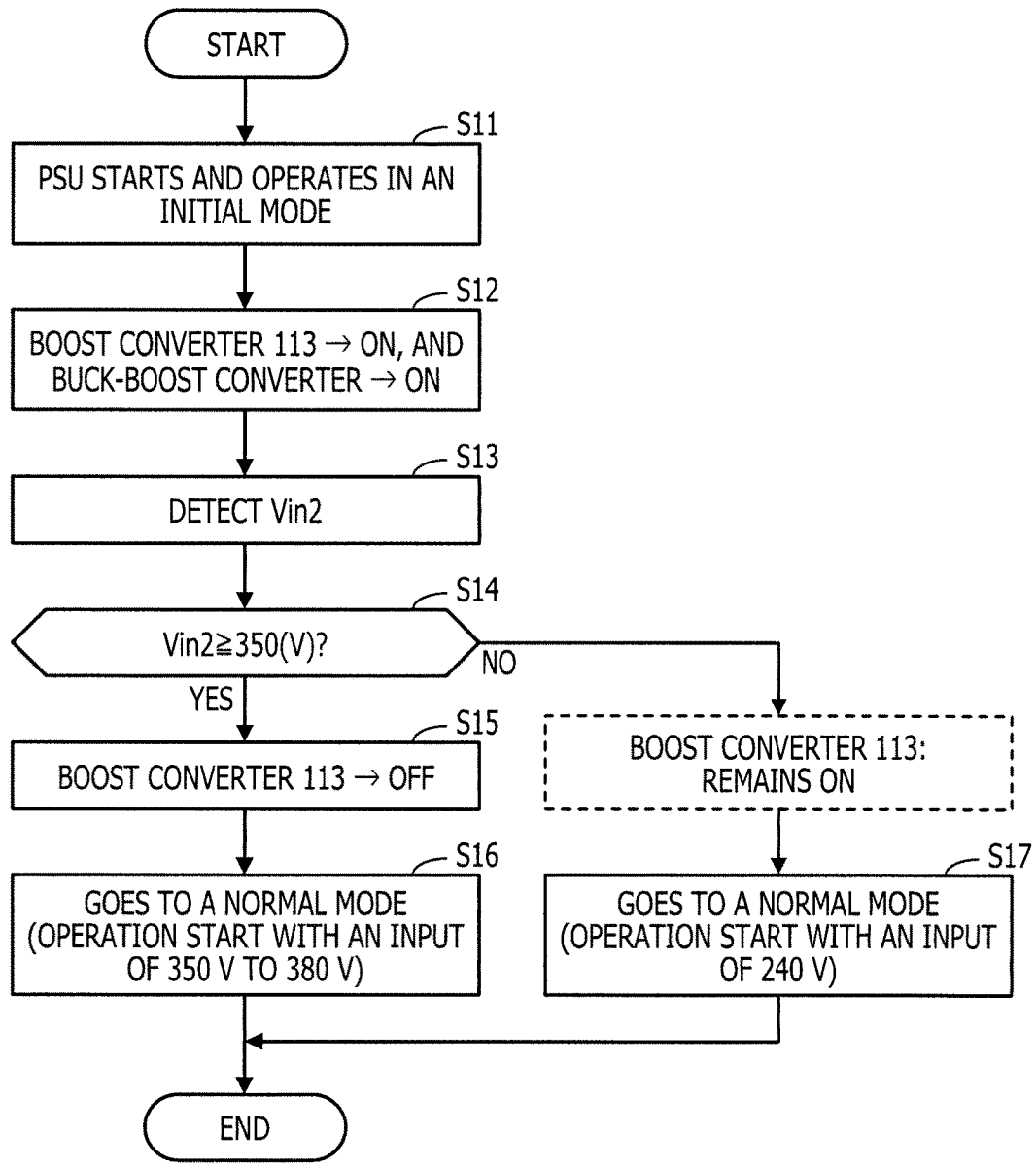
FIG. 12 is a flowchart illustrating an example of a control procedure at the time of starting the PSU.

First, FIG. 12 is a flowchart illustrating an example of a control procedure at the time of starting the PSU.

Step S11: The PSU 110 starts in accordance with the connection of the input cable to the storage device 100, or the turning on the distribution board 80 and the turning on the breaker of the power distribution unit 90. The controller 116 operates in the initial mode, which is an operation mode immediately after the start.

Step S12: The controller 116 turns on both the boost converter 113 and the buck-boost converter 114. Thereby, the boost operation of the boost converter 113 and the buck-boost converter 114 is started.

Step S13: The controller 116 detects the input voltage Vin2 of the boost converter 113 and the buck-boost converter 114.

Step S14: The controller 116 determines whether or not the detected input voltage Vin2 is equal to or higher than 350 V. If the input voltage Vin2 is equal to or higher than 350 V, the processing of step S15 is performed. On the other hand, if the input voltage Vin2 is lower than 350 V, the processing of step S17 is performed with the boost converter 113 kept on.

Step S15: The controller 116 changes the boost converter 113 to off.

Step S16: The controller 116 changes the operation mode to the normal mode. Thereby, the operation by the input voltage of 350 V to 380 V is started.

Step S17: The controller 116 changes the operation mode to the normal mode. Thereby, the operation by the input voltage of 240 V is started.

In this regard, after step S17 is performed, the boost converter 113 is kept on. Thereby, if the input voltage Vin2 changes to a voltage lower than 240 V, the boost converter 113 keeps the output voltage Vout2 at a voltage equal to or higher than 350 V, and a drop of the output voltage Vout1 of the PSU 110 is avoided.

Figure 13:
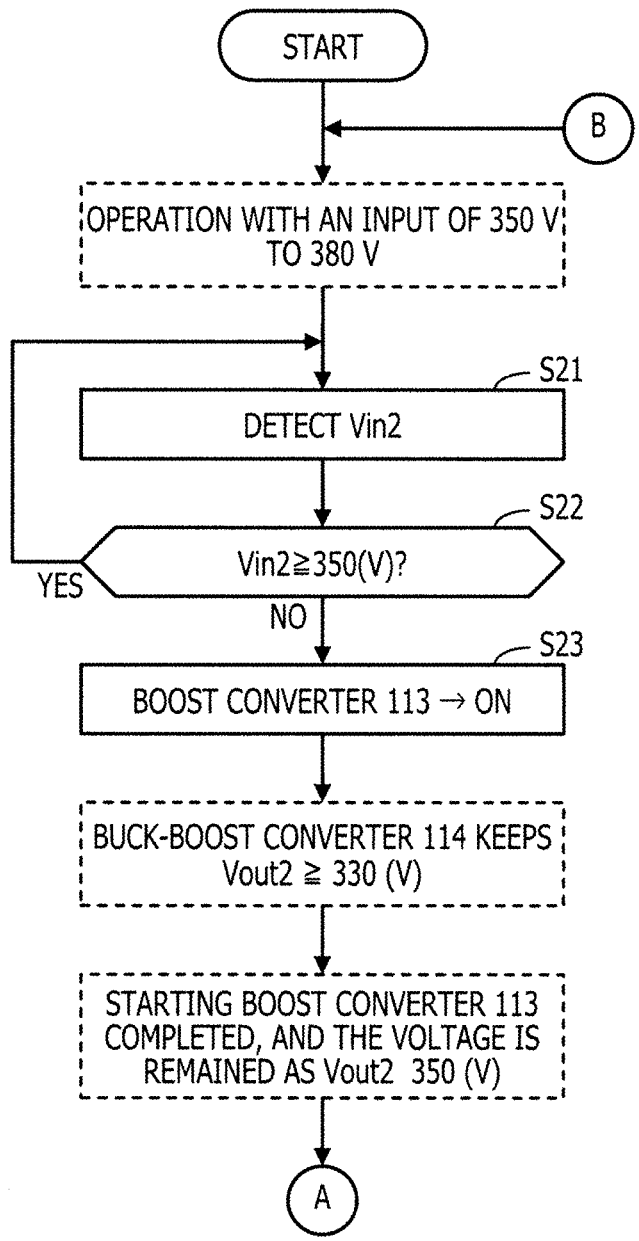
FIG. 13 is a flowchart (1 of 2) illustrating an example of a control procedure after operation with an input voltage of 350 V to 380 V has been started.
Figure 14:
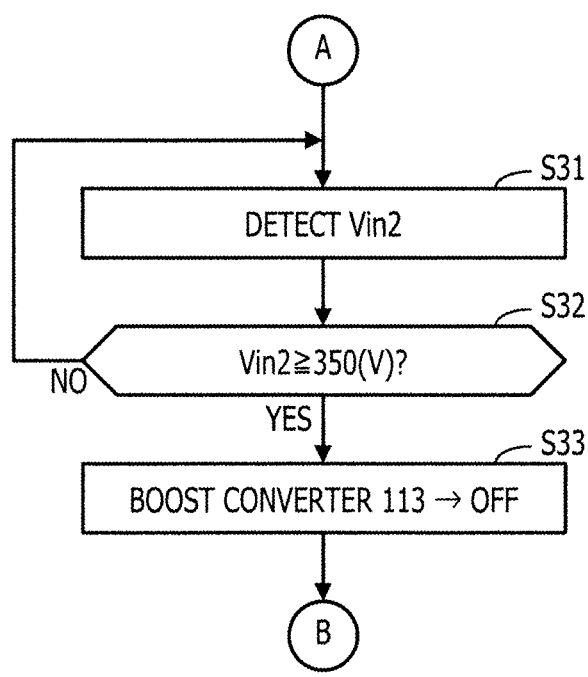
FIG. 14 is a flowchart (2 of 2) illustrating an example of a control procedure after operation with an input voltage of 350 V to 380 V has been started.

Next, FIG. 13 and FIG. 14 are flowcharts illustrating an example of a control procedure after operation with an input voltage of 350 V to 380 V has been started.

Step S21: The controller 116 detects the input voltage Vin2 of the boost converter 113 and the buck-boost converter 114.

Step S22: The controller 116 determines whether or not the detected input voltage Vin2 is equal to or higher than 350 V. If the input voltage Vin2 is equal to or higher than 350 V, the processing of step S21 is performed after a certain period of time. Thereby, while the operation is performed with the input voltage of 350 V to 380 V, the controller 116 monitors the input voltage Vin2 at certain time intervals. On the other hand, if the input voltage Vin2 is lower than 350 V, the processing of step S23 is performed.

Step S23: The controller 116 changes the boost converter 113 to on.

Thereby, the boost converter 113 is started, but until the boost operation by the boost converter 113 is started with a voltage equal to or higher than 350 V, the boost operation of the buck-boost converter 114 keeps the output voltage Vout2 at a voltage equal to or higher than 330 V. As a result, the output voltage Vout1 of the PSU 110 is kept at 12 V in the steady state. When the starting of the boost converter 113 is completed, the output voltage Vout2 is kept equal to or higher than 350 V by the boost operation of the boost converter 113.

Step S31: The controller 116 detects the input voltage Vin2 of the boost converter 113 and the buck-boost converter 114.

Step S32: The controller 116 determines whether or not the detected input voltage Vin2 is equal to or higher than 350 V. If the input voltage Vin2 is lower than 350 V, the processing of step S31 is performed after a certain period of time. Thereby, after the processing of step S23 is performed, the controller 116 monitors the input voltage Vin2 at certain time intervals. On the other hand, if the input voltage Vin2 is boosted to equal to or higher than 350, that is to say, if the voltage supply of 350 V to 380 V is returned, the processing of step S33 is performed.

Step S33: The controller 116 changes the boost converter 113 to of. After this, the processing returns to step S21 in FIG. 13, and the input voltage Vin2 is monitored.

With the PSU 110 described above, in the state in which the voltage of 240 V is supplied, after the boost converter 113 boosted the input voltage equal to or higher than 350 V once, the DC/DC converter 115 converts the voltage to the power source voltage of 12 V. Thereby, it is possible to avoid the occurrence of a power loss due to an increase in the size of the circuit parts in the PSU 110 and heating, or the like.

On the other hand, in the state in which the voltage of 350 V to 380 V is supplied, the boost converter 113 is turned off. Thereby, it is possible to reduce the power loss by the boost converter 113.

Also, both in the state in which the voltage of 240 V is supplied, and in the state in which the voltage of 350 V to 380 V is supplied, a current does not flow through the buck-boost converter 114, and thus it is possible to reduce the power loss of the buck-boost converter 114 that is turned on all the time.

If the input voltage drops from the state in which the voltage of 350 V to 380 V is supplied, the boost converter 113 is changed to on in order to boost the voltage to 350 V. At this time, until the starting of the boost converter 113 is completed, the output voltage Vout2 is kept equal to or higher than 330 V by the buck-boost converter 114 that has been kept on before that time. Thereby, it is possible to inhibit a voltage drop in the output voltage Vout1 to the extent that the output voltage Vout1 of the PSU 110 does not drop.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voltage control apparatus comprising:
    a first converter configured to convert an input voltage to an output voltage which is
        equal to or higher than a first voltage in when the first converter is in an operative state and the input voltage is lower than the first voltage,
        equal to the input voltage when the first converter is in an inoperative state and the input voltage is equal to or higher than the first voltage, and
        lower than the first voltage for a transition time when the first converter changes from the inoperative state to the operative state;
    a second converter coupled with the first converter in parallel and configured to convert the input voltage to a second voltage lower than the first voltage;
    a third converter configured to convert a higher voltage of the output voltage or the second voltage to a third voltage which is output by the voltage control apparatus, wherein the output voltage or the second voltage thereby compensates the third voltage;
    a memory; and
    a processor coupled to the memory and configured to:
        control the first converter to be in the inoperative state while the input voltage is equal to or higher than the first voltage,
        change the first converter from being in the inoperative state to being in the operative state when the input voltage is lower than the first voltage, and
        keep the first converter in the operative state after the transition time has elapsed.

2. The voltage control apparatus according to claim 1, wherein
    the processor sets the first converter to be in the inoperative state when the input voltage at starting time is equal to or higher than the first voltage,
    the processor sets the first converter to be in the operative state when the input voltage at starting time is lower than the first voltage, and
    the processor changes the first converter to be in the operative state when the input voltage becomes lower than the first voltage after setting the first converter to be in the inoperative state.

* * * * *